No. 768,331. PATENTED AUG. 23, 1904.
G. M. KITZMILLER.
SCALE AND POINTER MECHANISM FOR TYPE WRITING MACHINES.
APPLICATION FILED MAR. 30, 1904.
NO MODEL. 3 SHEETS—SHEET 1.

Witnesses
George M. Kitzmiller Inventor
by Walter B. Burron
Attorney

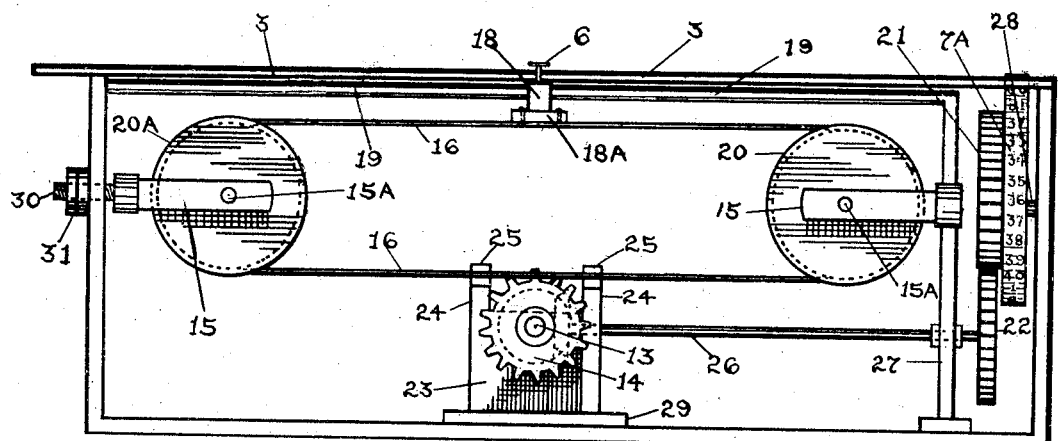

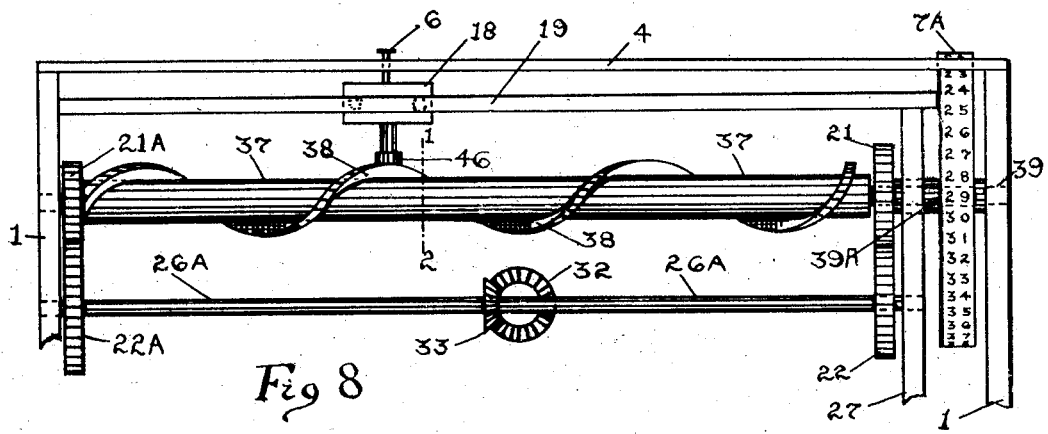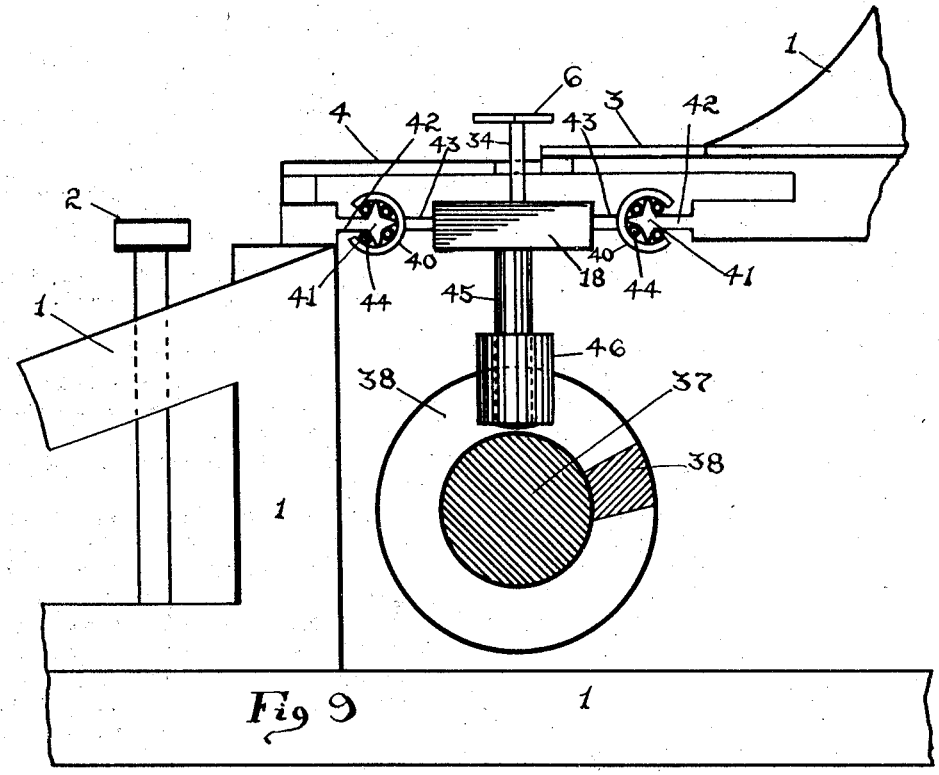

No. 768,331.

Patented August 23, 1904.

UNITED STATES PATENT OFFICE.

GEORGE M. KITZMILLER, OF NORFOLK, VIRGINIA, ASSIGNOR TO ELECTRIC TYPEWRITER COMPANY OF NORFOLK, INCORPORATED.

SCALE AND POINTER MECHANISM FOR TYPE-WRITING MACHINES.

SPECIFICATION forming part of Letters Patent No. 768,331, dated August 23, 1904.

Application filed March 30, 1904. Serial No. 200,674. (No model.)

*To all whom it may concern:*

Be it known that I, GEORGE M. KITZMILLER, a citizen of the United States, residing at Norfolk, in the county of Norfolk and State of Virginia, have invented new and useful Improvements in Scale and Pointer Mechanism for Type-Writing Machines, of which the following is a specification.

My invention relates to scale and pointer mechanism for type-writing machines, the scale and pointer being placed on the upper portion of the keyboard instead of near the platen, as is usually the case. I also provide an index-wheel suitably numbered or lettered, as will be more fully explained hereinafter.

Figure 1:
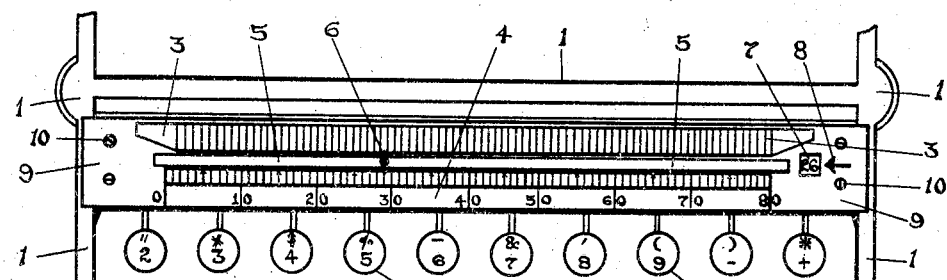
Figure 2:
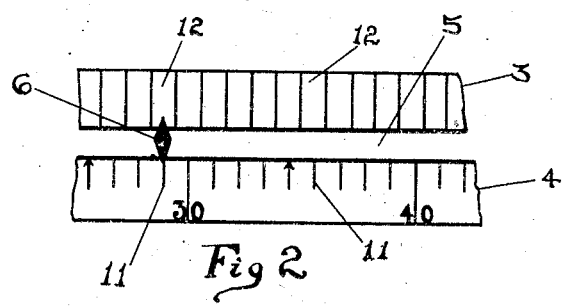
Figure 3:
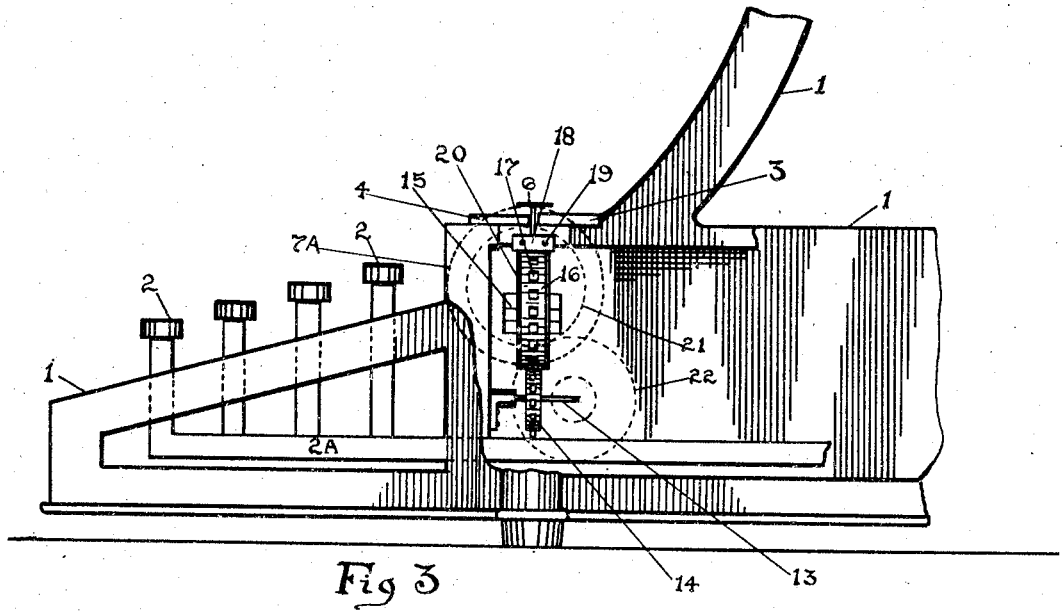

Referring to the drawings, Figure 1 is a plan of the scale with its pointer and one number visible on the index-wheel. Fig. 2 is an enlarged partial plan of the same, showing the division-lines opposite the spaces, as will be more fully described hereinafter. Fig. 3 is a partial side elevation of a type-writing machine, the frame of which is broken away to show my invention. Fig. 4 is a front elevation of the scale mechanism. Fig. 5 is a plan of the scale and pointer mechanism, the scale-plate, scale, and pointer being removed. Fig. 6 is an end elevation of the belt or tape support. Fig. 7 is an end elevation of the pointer truck or carriage. Fig. 8 is a front elevation of a modification of my invention which will be more fully described hereinafter. Fig. 9 is a side elevation and a part-sectional view of the same.

In the drawings like parts are indicated by similar reference-numerals in all the views.

1, Figs. 1, 2, and 3, is the frame of the type-writing machine.

2 and 2$^A$ are the usual key-levers suitably numbered and lettered.

3 is the inner or plain scale, located on the scale-plate 9. This scale is divided into spaces by lines in fractional parts of an inch, but preferably into tenths.

4 is the outer scale, also placed on the plate 9, which has a long aperture or slot between the scales 3 and 4. The scale 4 has the same divisions as the scale 3, but the lines are opposite the spaces of the inner scale 3, as shown in Fig. 2. The scale 4 is divided into eighty subdivisions and are numbered from "0" to "80" or other suitable numbers, there being, preferably, ten divisions between each numeral on the scale 4. The scale 3 is slightly higher than the scale 4, as shown in Fig. 9.

5 is the aperture or slot in the scale-plate 9 for the passage of the movable pointer 6, which traverses back and forth therein by suitable means.

7 is an aperture in the scale-plate 9 for exposing one numeral on the index-wheel 7$^A$, Figs. 3, 4, and 5, as it revolves.

8 is an arrow-head pointing to the aperture 7 and indicating when a numeral on the index-wheel is central or on a line with the arrow.

9 is the slotted scale-plate, fastened to the keyboard of the frame 1 by the screws 10, Fig. 1.

11 represents the division-lines on the scale 4, Fig. 2, which are opposite the spaces 12 on the upper or inner scale 3.

13, Fig. 3, is a shaft communicating with the escapement mechanism by suitable gearing.

14 is a gear or sprocket wheel on the shaft 13 and adapted to rotate with it.

15 and 15$^A$ are bearing-supports for the flanged wheels 20 and 20$^A$.

16 is a perforated metal band, belt, or tape passing over the wheels 20 and 20$^A$. The strap or tape 16 has perforations 17 throughout its length. The perforations are preferably square or rectangular and engage with the teeth of the gear or sprocket wheel 14, which imparts a horizontal movement to the band or tape 16. The proper tension of the band or belt is adjusted by means of the screw 30 and nuts 31, Fig. 4.

18 is a truck or carriage sliding on the rods 19, which pass through the apertures 19$^A$ and 19$^A$, Fig. 7, for two rods placed across the machine. (One only is shown at 19, Fig. 4.)

18$^A$ is a base-plate on the truck or block 18 for attachment with the band or belt 16 and also forming a means for joining the two ends of the band, which are held to the truck 18 by means of the screws 35.

20 and 20ᴬ are the flanged wheels for the belt 16, already described. These wheels have, preferably, smooth faces or treads; but I am not confined to such, as I may provide suitable teeth or corrugations, if deemed expedient.

22, Figs. 3 and 4, is a gear-wheel which drives another similar wheel 21, forming a part of the index-wheel 7ᴬ.

23 is a support for the sprocket-wheel 14 and the shafts 13 and 26, which carries the bevel or miter gears 32 and 33, respectively. The shaft and gear 26 and 33 are nearly or at right angles to the main driving shaft or gear 13 and 32 and drive the gears 21 22 and the index-wheel 7ᴬ. The support 23 is provided with standards 24, which are bent at right angles on their upper ends, as shown in Fig. 6, as at 25, and form forks for guiding the band or belt 16.

27 is a support for the gear 22 and the shaft 26, also as a means for support for the wheel-supporting arm 15.

28 is the shaft for the index-wheel 7ᴬ.

29 is the base for the support 23.

34 is the pin for supporting the pointer 6.

36 is a bearing-sleeve in the support 23 for the shaft 13.

Figs. 8 and 9 show a modification of my invention in which I use a spiral screw or elongated worm-thread for actuating the carriage or truck 18, which carries the pointer. In Fig. 8 the worm or screw is shown in elevation, and Fig. 9 shows the screw in section on the line 1 2 in Fig. 8. 37 is the screw cylinder or rod. 38 is the thread, having a long pitch and adapted to screw the truck or carriage 18 along as it revolves. The truck is provided with a pin 45, having a roller 46 at the lower end, which engages with the thread 38. The worm or screw is connected to the shaft 26ᴬ by the gears 21ᴬ and 22ᴬ, motion being communicated to the index-wheel 7ᴬ and gear-wheel 21, which are rigidly secured together by the sleeve 39ᴬ and loosely mounted on the shaft 39 by the gear-wheel 22 on the shaft 26ᴬ. The truck 18 is provided with arms 43, on which are attached the sleeves 40 for inclosing the balls 44, which roll on the track 41. The tracks 41 are supported by suitable means to the frame of the machine, 42 being a narrow plate connecting the tracks 41 with their supports. The tracks are provided with grooves or corrugations between which the balls are inclosed, as shown at 41 in Fig. 9.

I will now describe the operation of my invention. Referring to Fig. 1, when it is desired to find the division-line on the scale 4 at which the pointer 6 is to be placed, so that a line of writing may be located centrally of the sheet of paper, the carriage is placed at its extreme right, the pointer 6 then being at "0" on the scale 4. The space-bar is depressed once for each letter, space, or punctuation-mark in the given heading or line to be written. When the space-bar has been depressed for the last letter, space, or punctuation-mark in the said heading, the number on the index-wheel 7ª, Figs. 4, 5, appears in the aperture 7, Fig. 1, indicating the division-line at which the pointer 6 should be set on the scale 4 for the commencement of the heading referred to, so that when written it will be located centrally of the sheet. In Fig. 1 it may be assumed that the heading to be located contained thirty letters or spaces. The number appearing in the aperture 7 would be "25." Now when the carriage is moved to the right the pointer 6 moves to the left until it is opposite the twenty-fifth division-line. When the writing-line has been completed, it will be an equal distance from either edge of the sheet or centrally located on the sheet of paper. When the writing-line to be centrally located contains a number of letters and spaces not divisible by two, as shown in Fig. 1, where the pointer 6 is opposite the twenty-ninth division-line, the numbers in the aperture 7 would be partly visible in the said aperture—that is, the arrow 8 would point between the numbers "25" and "26," (the number "26" being shown in Fig. 1 for the sake of clearness of reference.) Hence the space-bar should be depressed once arbitrarily, which would bring the pointer 6 opposite the thirtieth division-line, and the number "25" would appear in the aperture 7, indicating that the pointer 6 should be placed opposite the twenty-fifth division-line on scale 4 in order to centrally locate the line of writing. In the accomplishment of the above result the coaction of the parts of my invention is as follows: A rotary motion is communicated by any suitable carriage and escapement mechanism through a space-bar, which is common to most type-writers, to the shaft 13, the beveled gear 32, the sprocket-wheel 14, engaging the band 16, Figs. 4 and 5, by means of the aperture 17 in the said band, the band being supported in the guides 25. By the means indicated a lateral motion is communicated to the said band 16, which passes over the flanged pulleys 20, the said band communicating a lateral motion to the truck 18 and pointer 6, mounted thereon, the said truck traveling in the slot 5. The truck 18 is movably supported on the rods or track 19. Meshing in the beveled gear 32, Fig. 5, is a beveled gear 33, which communicates motion to the gear 22, Fig. 4, which meshes with the gear 21ᴬ, rotating the index-wheel 7ᴬ, the wheel 7ᴬ being so numbered and geared that two spaces are required to be covered before a new number appears in the aperture 7ᴬ, Fig. 1. The wheel 7ᴬ is numbered consecutively ascending the numerical scale; but in the operation the numbers descend the numerical scale. There are one-half as many consecutive numbers on the wheel as there are division-lines on the scale. The wheel 7ᴬ coacts with the scale 4 in such a manner, as above described, that as the pointer 6 ascends the numerical scale the numbers on the wheel descend the numerical scale one number to two of the pointer in its ascent of the numerical scale.

The operation of the modification Fig. 8 is similar to that previously explained, the coaction of the parts in this case being as follows: Motion is communicated to the pointer 6 by the worm or screw 38, motion being communicated to the cylinder 37 through the beveled gears 32 and 33 and the gears 22$^A$ and 21$^A$. A less-rapid motion is communicated to the index-wheel 7$^A$ by the gears 22 and 21, the gear 21 and index-wheel 7$^A$ being rigidly secured together by the sleeve 39$^A$, the gearwheel 21 and index-wheel 7$^A$ being mounted loosely on the shaft 39 through the sleeve 39$^A$.

The unnumbered scale 3 is of any suitable material from which pencil-marks may be erased and has for its purpose to produce a convenient method of writing numbers in columns, so that units, tens, and hundreds, &c., will be arranged correspondingly under each other—as, for example

| 1,276,874.00 | 250,863.00 | 867,943.00 |
|---:|---:|---:|
| .25 | 100.89 | 1,846.00 |
| 10.25 | 1,987.43 | 73.10 |

In the above example the highest amount in each column would be written in pencil on scale 3 in the spaces. The pointer 6 pointing to the spaces of this scale and traveling, as shown, from left to right, and being placed on the keyboard under the eyes of the operator obviates the necessity of looking at the platen to see that the columns are arranging themselves vertically and are following their proper order.

I am not confined to the details of construction described, but may make such modifications as may be deemed expedient without departing from the subject-matter claimed.

Having described my invention, what I claim, and desire to secure by Letters Patent, is—

1. In a scale for type-writing machines, the combination with a frame-plate extending across the upper portion of the keyboard, a slot or elongated aperture in the said plate, a uniformly-divided scale mounted on one side of the said slot or aperture and a numbered subdivided scale on the other side of the said slot, the division-lines of one scale being opposite the spaces of the other, the said scale being subdivided, a horizontally-movable lozenge-shaped gear-controlled pointer adapted to move in the said slot, and between the said scales, and means for communicating motion to the said pointer, substantially as described.

2. In a scale for type-writing machines, the combination of a plate having a horizontal slot, a line-divided equally-spaced scale on one side of the said slot, a numbered line-divided scale on the other side thereof, the division-lines of one scale being opposite the spaces of the other, a movable pointer adapted to traverse back and forth between the two scales and in the slot, an aperture or opening on the end of the said scale-plate for exposing to view suitable revolving numbers therein, and an arrow-head or stationary pointer indicating the horizontal center line of said aperture or opening, substantially as described.

3. In a scale and pointer mechanism for type-writing machines, the combination of a scale-plate, an aperture in the said plate, a movable key-lever-actuated pointer adapted to move in the said slot, and an equally line-divided scale on each side of the said slot, the lines of one scale not in line with the division-lines of the other, an opening or aperture on the end of the said scale-plate, and a rotary index-wheel beneath the scale-plate having numbers or letters on the face thereof and adapted to expose to view the numbers or letters one at a time in the said opening or aperture, substantially as described.

4. In a scale and pointer mechanism, the combination with a slotted scale-plate, a numbered line-divided equally-spaced scale on each side of the said slot, one of the scales being higher than the other, a pointer adapted to move between the said scales, a key-lever-operated index-wheel beneath the said scales, the said wheel having numbers or letters on the face or tread thereof, means for exposing to view any of the numbers on the said wheel on the scale and means for rotating the said index-wheel, substantially as described.

5. In a scale and pointer mechanism for type-writing machines, the combination of a slotted scale-plate, and scales on each side of said slot, a pointer adapted to move in said slot, the said pointer having apertures therein, and rods for supporting the said pointer, a perforated band or belt passing over flanged pulleys, and means for horizontally moving the said perforated belt and the pointer, substantially as described.

6. In a key-lever-operated scale mechanism for type-writing machines, the combination with a set of equally-spaced scales a movable pointer adapted to traverse back and forth between the said scales, a pointer, a pointer-supporting truck or block, a series of rods extending across the machine for movably supporting the said pointer truck or block, a perforated band or belt for imparting motion to the said pointer and truck, the said belt passing over flanged pulleys or wheels, and a key-lever-rotated sprocket or gear wheel engaging in the said perforations in the band or belt, and actuating the same, means for increasing and decreasing the tension of the said band or belt, substantially as described.

7. In a scale and pointer mechanism, the combination of a set of line-divided equally-spaced scales, a slot between the said scales, a horizontally-movable pointer adapted to pass back and forth between the scales, a metal band or belt for movably supporting the said pointer, a set of flanged pulleys or wheels for operating the said band or belt, a toothed sprocket-wheel or pulley for actuating the said belt and the flanged pulleys, an index-wheel carrying numbers or letters, means for driving the said belt, sprocket and index wheels, and a support for the said sprocket-wheel having forked angular ends for guiding the said belt to the teeth of the said wheel, substantially as described.

8. In a scale and pointer mechanism, the combination with a set of slot-separated line-divided equally-spaced scales, a pointer adapted to move between the said scales, a metal band or belt carrying the said pointer, and flanged pulleys or wheels for driving the said belt and pointer, a sprocket wheel or gear for driving the said band or belt, means for driving the said geared wheel, a face-numbered index-wheel below and extending above the said scales, the said index-wheel being driven by the said sprocket-wheel by suitable gearing, means for adjustably supporting the said flanged pulleys, and a forked support for the toothed sprocket-wheel and for guiding the said band or belt to the teeth thereof, substantially as described.

9. In a scale mechanism for type-writing machines, the combination of a set of slot-divided line-spaced scales having lines staggered to the spaces of one of the scales, a sleeved supporting-pointer adapted to move between the said scales, a vertical pin-supported roller beneath the said pointer, a gear-controlled band or rotary spiral screw or worm adapted to horizontally move the said pointer, and tracks for supporting the said pointer, a numbered index-wheel operative by the said band or worm and adapted to move therewith, means for rotating the said index-wheel from an escapement mechanism by means of the key-levers, substantially as described.

10. In a scale mechanism for type-writing machines, the combination of a keyboard provided with a scale-plate, a slot or elongated aperture in the said plate, a uniformly-divided scale mounted on each side of the said slot or aperture, division-lines on one scale staggered with relation to the division-lines on the other scale, a movable gear-controlled pointer in the said slot, a gear-controlled index-wheel coacting with the said pointer, and means for communicating motion to the said pointer and index-wheel, substantially as described.

11. In a scale mechanism for type-writing machines, the combination with a keyboard, a slotted frame-plate forming a part of the said keyboard, longitudinally-mounted line-divided scales on the said plate, a gear-controlled pointer adapted to travel in the slotted plate, a face-numbered gear-controlled index-wheel beneath the plate and scales, an aperture in the plate over the said index-wheel, and means for communicating motion to the said pointer and index-wheel, substantially as described.

12. In a scale mechanism for type-writing machines, the combination with a slotted plate mounted on the keyboard, a gear-controlled pointer movable in the said slotted plate, a gear-controlled consecutively-numbered index-wheel, the said wheel carrying one-half as many consecutively-arranged numbers as there are division-lines on the scale, and rotary means for moving the pointer and wheel simultaneously, substantially as described.

In testimony whereof I have hereunto affixed my signature in the presence of two subscribing witnesses.

GEORGE M. KITZMILLER.

Witnesses:
ROBERT E. JOPLEY,
ALEXANDER CALCOTT.